United States Patent
Wang et al.

(10) Patent No.: US 7,371,018 B2
(45) Date of Patent: May 13, 2008

(54) OPTICAL-ELECTRIC CONNECTOR

(75) Inventors: Ning Wang, Kunshan (CN); Zhi-Qiang Chen, Kunshan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/475,372

(22) Filed: Jun. 27, 2006

(65) Prior Publication Data
US 2007/0003192 A1 Jan. 4, 2007

(30) Foreign Application Priority Data
Jun. 29, 2005 (CN) .................. 2005 2 0073310 U

(51) Int. Cl.
G02B 6/36 (2006.01)
(52) U.S. Cl. .......................... 385/92; 385/88
(58) Field of Classification Search .................. 385/88, 385/92
See application file for complete search history.

(56) References Cited
U.S. PATENT DOCUMENTS
5,439,394 A 8/1995 Ikeda

| | | | |
|---|---|---|---|
| 7,081,023 B2* | 7/2006 | Zhang et al. | 439/668 |
| 7,182,648 B2* | 2/2007 | Han et al. | 439/668 |
| 2002/0136506 A1* | 9/2002 | Asada et al. | 385/92 |
| 2003/0068140 A1* | 4/2003 | Brezina et al. | 385/92 |
| 2004/0037517 A1* | 2/2004 | Dair et al. | 385/92 |

* cited by examiner

Primary Examiner—Michelle R. Connelly-Cushwa
Assistant Examiner—Rhonda S. Peace
(74) Attorney, Agent, or Firm—Wei Te Chung

(57) ABSTRACT

An optical-electric connector (100) includes an insulating housing (10), a number of terminals, an optical element (40) and a shielding shell (30). The insulating housing (10) defines a mating face (11) having a mating hole (111) thereon, a receiving room (13) communicating with the mating hole and a number of terminal slots (15) receiving the terminals. The optical element is assembled in the insulating housing. The shielding shell substantially encloses the insulating housing and comprises a grounding tab (33) extending from an upper face thereof, the terminal comprises a grounding terminal and a detecting terminal.

17 Claims, 7 Drawing Sheets

US 7,371,018 B2

OPTICAL-ELECTRIC CONNECTOR

BACKGROUND OF THE INVENTION

1. Field of the Invention

The present invention generally relates to a connector, and particularly relates to an optical-electric connector for receiving an audio and an optical plug selectively.

2. Description of Prior Arts

Miniaturized audio visual apparatuses such as a DVD (Digital Versatile Disk) player/recorder, MD (Mini-Disk) player/recorder, etc., portable audio apparatuses such as an MD portable player/recorder, CD portable player/recorder, memory type audio apparatus (audio apparatus using a memory card), etc., personal computer, mobile communication apparatuses such as a mobile phone, pocket or portable telephone etc., or the like have been miniaturized more and more in their external configurations or shapes and dimensions or sizes, and accordingly, an input terminals and/or output terminals built in or mounted to these electronic apparatuses have been also miniaturized. Particularly, in recent years, with the advance of optical connector mounted on thereto as an optical signal input terminal for receiving an optical or light digital signal or an optical signal output terminals for outputting an optical connector to the optical cable.

An optical connector mounted to any one of various electronic apparatuses and appliances has a light receiving element or light emitting element housed in the connector body thereof, and for instance, one of two optical plugs mounted to an optical cable at opposed ends thereof respectively, that transmits an optical or light digital signal is directly plugged in the optical connector, so that an optical digital signal is transmitted from the optical cable to the optical connector or from the optical connector to the optical cable.

A conventional optical-electric connector usually comprises an insulative housing, a plurality of signal terminals received in the housing. And a grounding terminal received in the housing. But in the conventional optical-electric connector, signal terminals are engaged with signal portion of a corresponding plug before the grounding terminal contacts with grounding terminal of the plug connector. A noise may be produced before the grounding terminals contacting each other. Further the conventional optical-electric connector has not provided a detecting terminal for detecting whether an audio plug or an optical plug being plugged in.

Hence, it is desirable to have an optical-electric connector with an improved grounding terminal and detecting terminal to overcome the above-mentioned disadvantages of the prior art.

SUMMARY OF THE INVENTION

It is an object of the present invention to provide an optical-electric connector with a grounding terminal for obtaining better anti-EMI effectiveness and a detecting terminal.

In order to achieve the above-mentioned object, an optical-connector comprises an insulating housing, a plurality of signal terminals, a grounding terminal, a detecting terminal, an optical element and a shielding shell, the insulating housing defines a mating face having a mating hole thereon, a receiving room communicating with the mating hole and a plurality of terminal slots, the terminals are received in the terminal slots of the insulating housing, the optical element assembled in the insulating housing, the shielding shell substantially encloses the insulating housing, the grounding terminal is assembled in a proper position for contacting with a grounding portion of a corresponding audio plug before the signal terminals contacting each other.

Other objects, advantages and novel features of the invention will become more apparent from the following detailed description of the present embodiment when taken in conjunction with the accompanying drawings.

BRIEF DESCRIPTION OF THE DRAWING

FIG. 5 is a section view of the optical-electric connector before an audio plug connector assembled there in; and FIG. 6 is a section view of the optical-electric connector with an audio plug connector partly assembled in; and FIG. 7 is a section view of the optical-electric connector with an audio plug connector assembled in.

DETAILED DESCRIPTION OF THE PREFERRED EMBODIMENT

Figure 1:
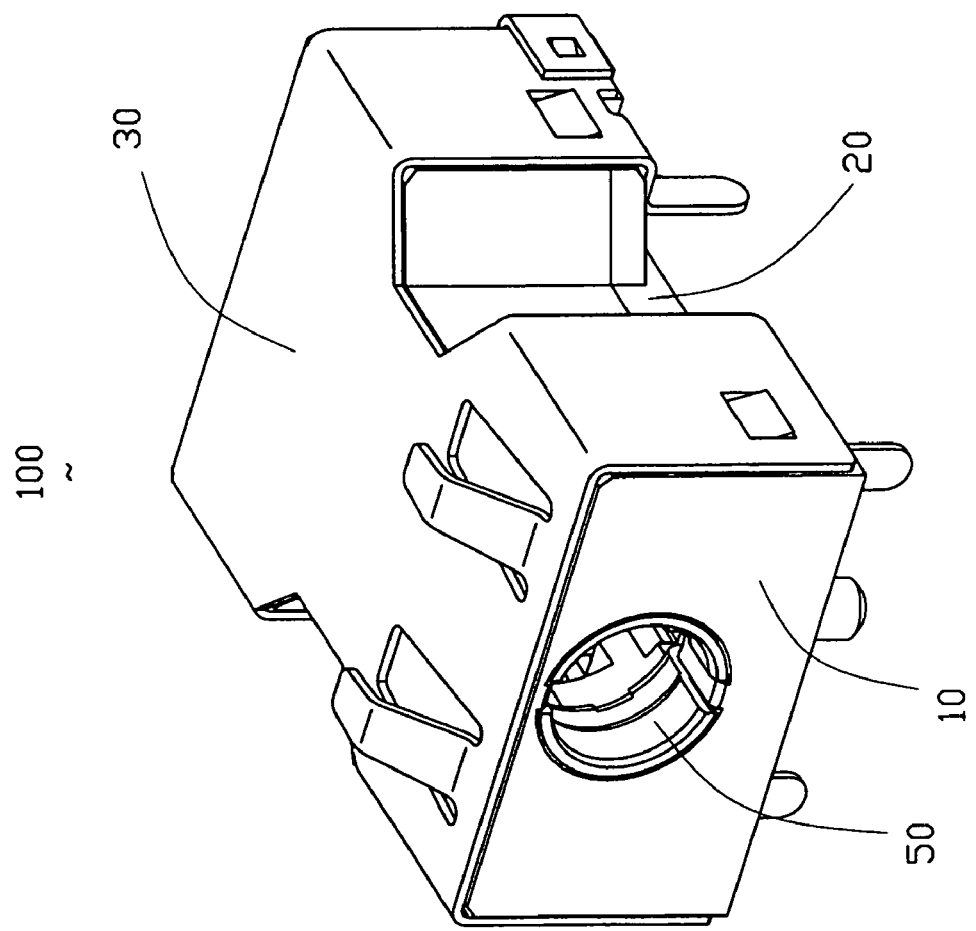
FIG. 1 is a perspective view of an optical-electric connector in accordance with the present invention.

Reference will now be made to the drawing figures to describe the present invention in detail.

With reference to FIGS. 1 to 4, an optical-electric connector 100 in accordance with the present invention is a straight-shaped jack connector for receiving an audio plug or an optical plug selectively, and comprises an insulating housing 10, a plurality of signal terminals 60, 70, 80 and a grounding terminal 501, a detecting terminal 502 received in the insulating housing 10 respectively, a retainer 20, an optical element 40 for receiving/emitting optical signal and a shielding shell 30 enclosing the housing 10.

The shielding shell 30 comprises a flat portion 31, two pairs of lateral plates 32 extending downwardly from the opposed ends of the flat portion 31, and a rear portion (not labeled) extending downwardly from a back end of the flat portion 31. A pair of resilient plate 33 curvedly extending upwardly and rearwardly from the flat portion 31 and has a contacting portion at the distal end thereof. Each lateral plate 32 defines a retaining hole 321 thereon. The lateral plate 32 at a back side of the flat portion 31 has leg portion 322 comprising a supporting portion 323 extending horizontally from a bottom side thereof and a tab 324 extending downwardly from the supporting portion 323.

Figure 2:
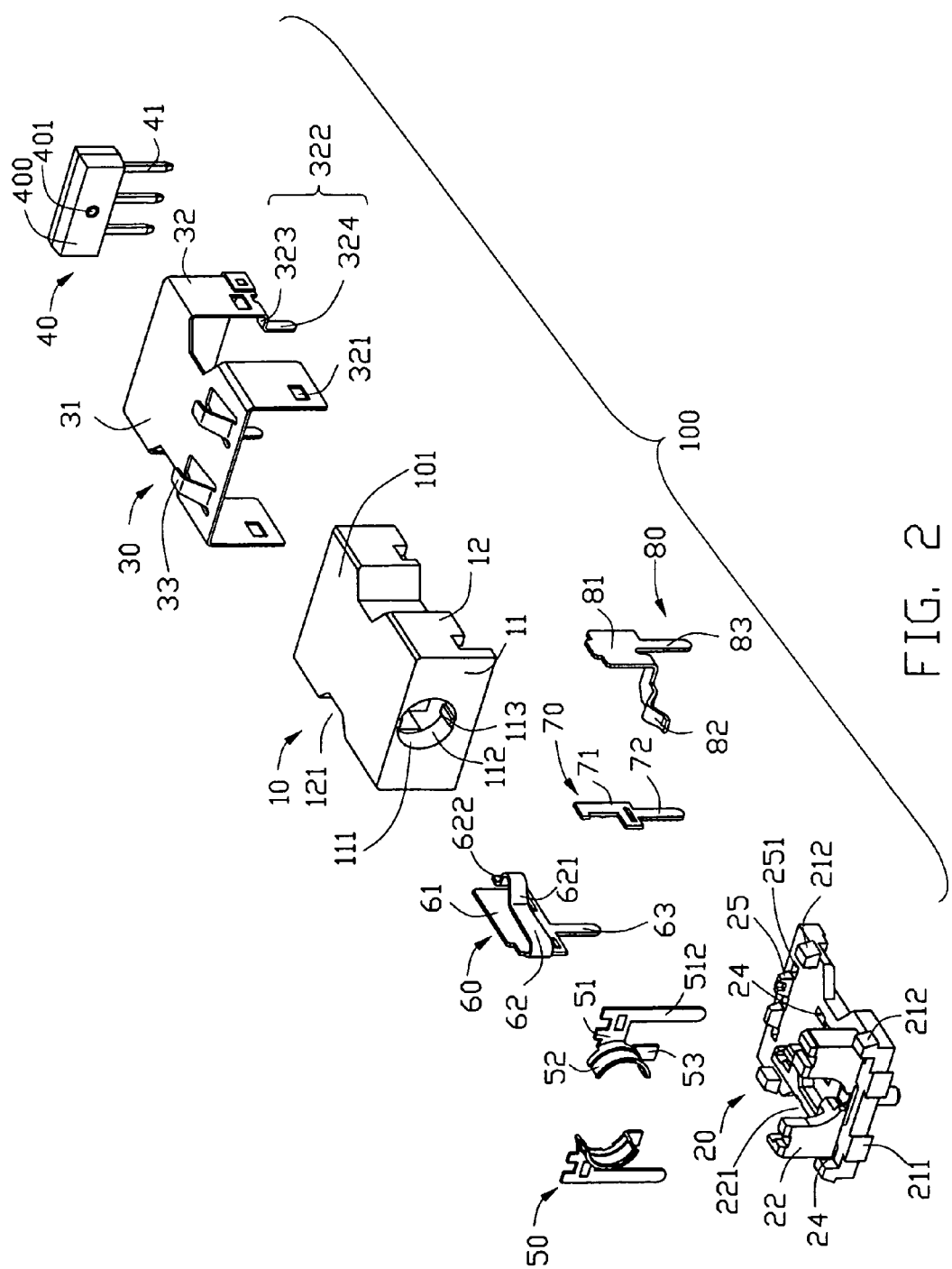
FIG. 2 is an exploded, perspective view of the optical-electric connector of FIG. 1.
Figure 3:
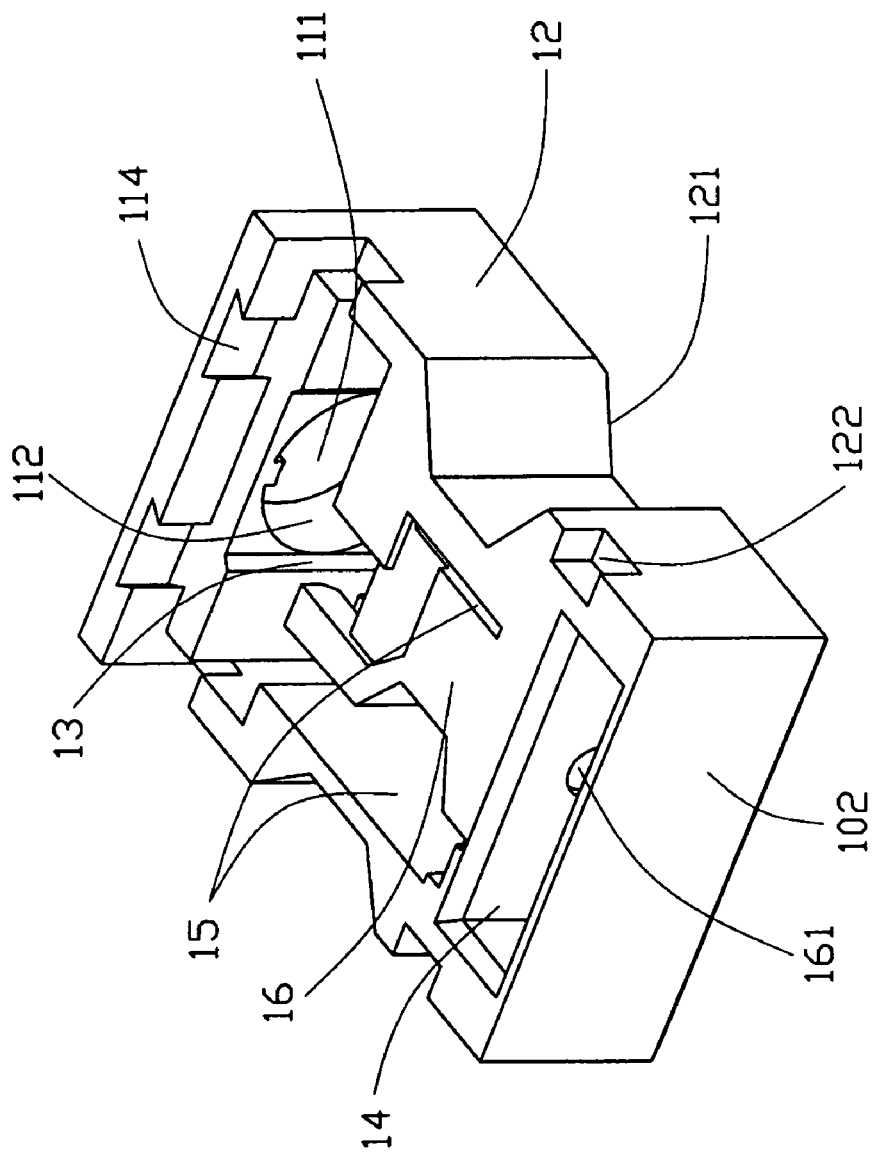
FIG. 3 is a perspective view of an insulating housing of the optical-electric connector.

With reference to FIG. 3 in conjuction with FIG. 2, the insulating housing 10 comprises an upper wall 101, a pair of side walls 12 extending downwardly from the upper wall 101, a front wall 11 extending downwardly from a front edge of the upper wall 101, and a rear wall 102 extending from a back edge of the upper wall 101, A pair of depressed portions 121 are formed at the center of the side walls 12, respectively. Each side wall 12 defines a pair of cutouts 122 thereof corresponding to the retaining holes 321 of the shielding shell 30. The front wall 11 is higher than the rear wall 102 and defines a mating hole 111 having an inner mating face 112 therethrough for insertion of a mating plug (not shown). A pair of keys 113 protrudes inwardly on the inner mating face 112. The front wall 11 comprises a mating face for mating with the plug and a pair of swallow-slots 114 at an inner face thereof. The insulating housing 10 comprises a receiving room divided into a front receiving room 13 and a rear receiving room 14 by a separating portion 16. A connecting hole 161 is formed on the separating portion 16 in a position aligning with the mating hole 111 of the front wall 11. A plurality of terminal slots 15 are formed near to the two sides of the front receiving room 13 and communicate with the front receiving room 13.

Figure 4:
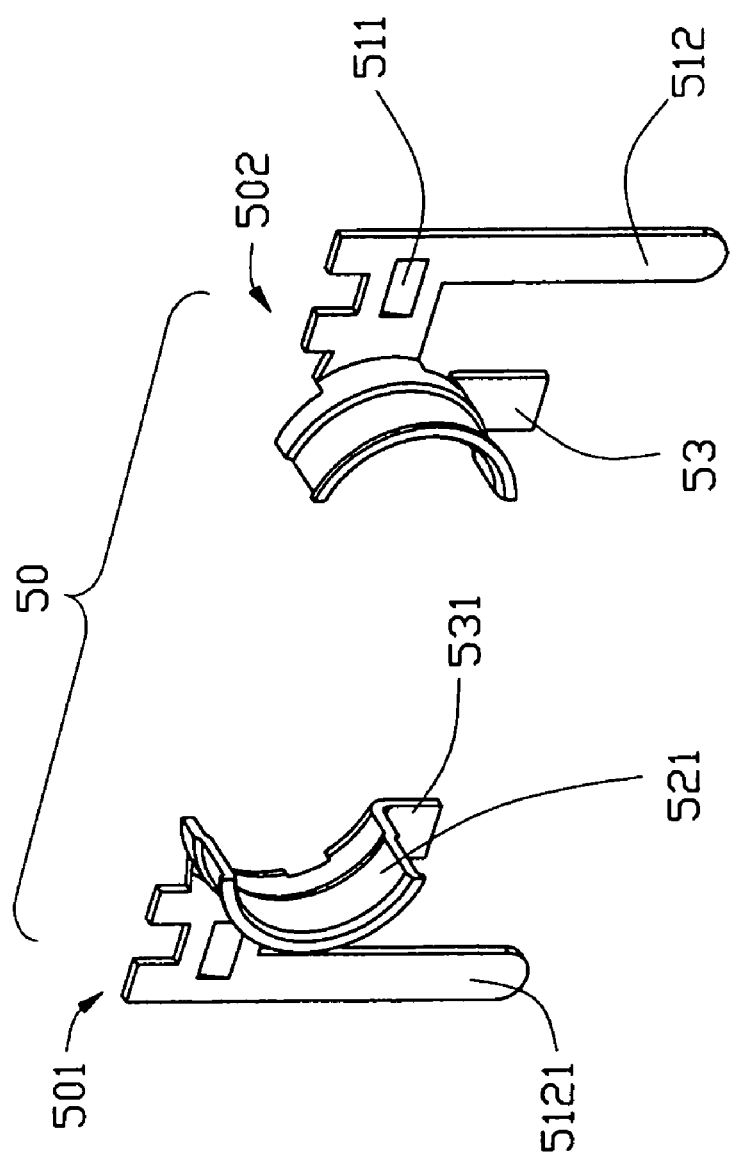
FIG. 4 is a perspective view of a grounding terminal and a detecting terminal of the optical-electric connector.

With reference to FIGS. 2, 4. Each Terminals 60, 70, 80 comprises a base portion 61, 71, 81 with a leg portion 63, 72, 83 extending downwardly respectively, the resilient terminal 60 further has a resilient arm 62 extending rearwardly into the front receiving room 13 of insulating housing 10. The resilient arm 62 has contacting portion 621 and an end portion 622 at the distal end thereof. The resilient terminal 60 and the retaining terminal 70 can be electrically connected or spaced like a switch. The terminal 80 further has a resilient arm 82 extending frontwardly into the front receiving room 13 of the insulating housing 10. Terminals 50 comprise a grounding terminal 501 and a detecting terminal 502 formed almost symmetrically. Each detecting terminal 502 comprises a base portion 51 with a projection 511 formed thereon, a leg 512 extending downwardly from the base portion 51. A C-shaped contacting portion 52 formed on an edge of the base portion 51 with a leg 53 extending downwardly. The grounding terminal 501 has a base portion, a contacting portion 521, legs 521, 5121 each forms almost symmetrically to that of the detecting terminal 502.

With reference to FIG. 2, the retainer 20 has a front face with a pair of swallow-blocks 211 thereon for being received in the swallow-slots 114 on the insulating housing 10. The lateral edges of the retainer 20 define a plurality of protrusions 212 for being received in the cutouts 122 of the insulating housing 10. A plurality of passageways 24 is defined on the retainer 20 for retaining corresponding terminals. A pair of supporting blocks 22 is formed near the passageways 24 for properly positioning the retainer 20 with respect to the housing 10. The retainer 20 defines a receiving portion for receiving the optical element 40. The receiving portion comprises three plugging holes 251 and a pair of retaining blocks 25 formed between the plugging holes 251. Refer to FIG. 2. The optical element 40 comprises a receiving portion 400, legs 41, and the receiving portion 400 of the optical element 40 comprises a plugging hole 401 for the optical plug to extending therethrough.

For better showing the relationship between the members of the connector, the terminals and the optical element 40 is assembled on the retainer 20. Actually, terminals 50, 60, 70, 80 are first received in the corresponding terminal slots 15 of the insulative housing 10, the optical element 40 is assembled in the back receiving room 14, and then the retainer 20 is engaged into the insulating housing 10 in a down-to-up direction. The terminal slots 15 are big enough for receiving corresponding terminals on the retainer 20. The C-shaped contacting portions 52, 521 are assembled in two sides of the inner mating face 112 respectively and between keys 113. The supporting blocks 22 support the terminals 50 not to be curved while the plug is inserted into the connector 100. The protrusions 212 are received in the corresponding cutouts 122 of the insulating housing 10. Each terminal extends into the corresponding passageway 24 and beyond the bottom face of insulating housing 10. The receiving portion 400 of the optical element 40 (reference to FIG. 2) locates in a line with the connecting hole 161 of the separating portion 16 of the insulating housing 10 and a retaining structure (not shown) for engaging with the retaining blocks 25 of the retainer 20. The part terminals and the optical element 40 beyond the bottom face of the insulative housing are soldered to the printed circuit board (not shown).

At last, the shielding shell 30 encloses the insulating housing 10 and the retainer 20. The shielding shell 30 has its retaining holes 321 engaging with the protrusions 212 of the retainer 20, meantime, the supporting portion 323 of the lateral plates 32 of the shielding shell 30 engages with the bottom face of the insulating housing 10 for supporting the insulating housing 10 and the retainer 20. The tabs 324 of the lateral plates 32 are used to ensure the connector 100 on a right position.

Figure 5:
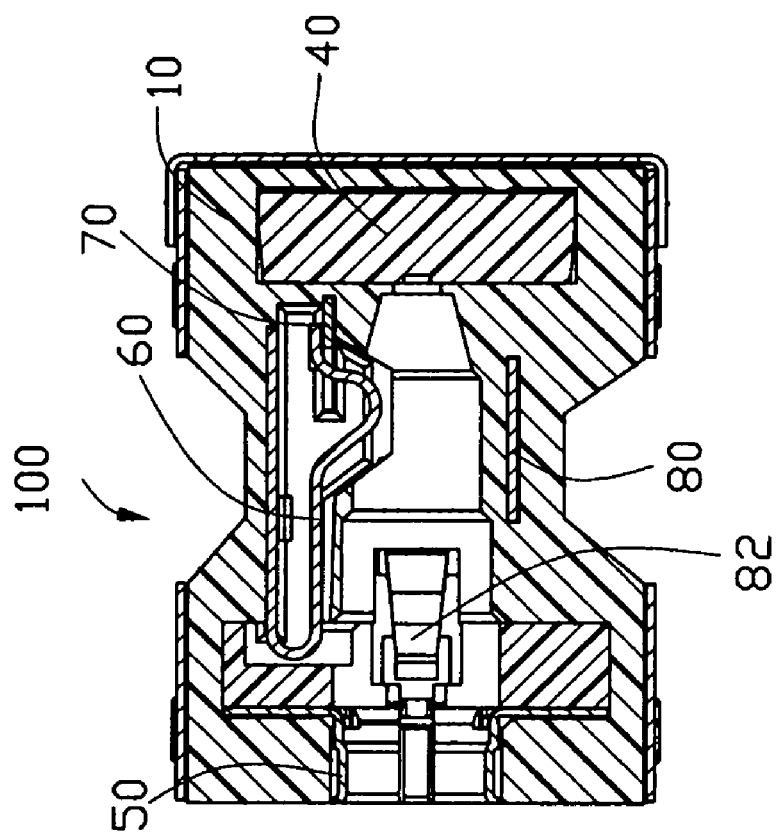
Figure 5:
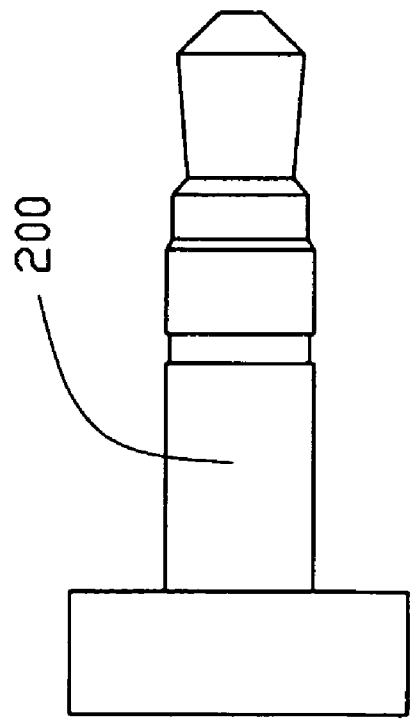
Figure 6:
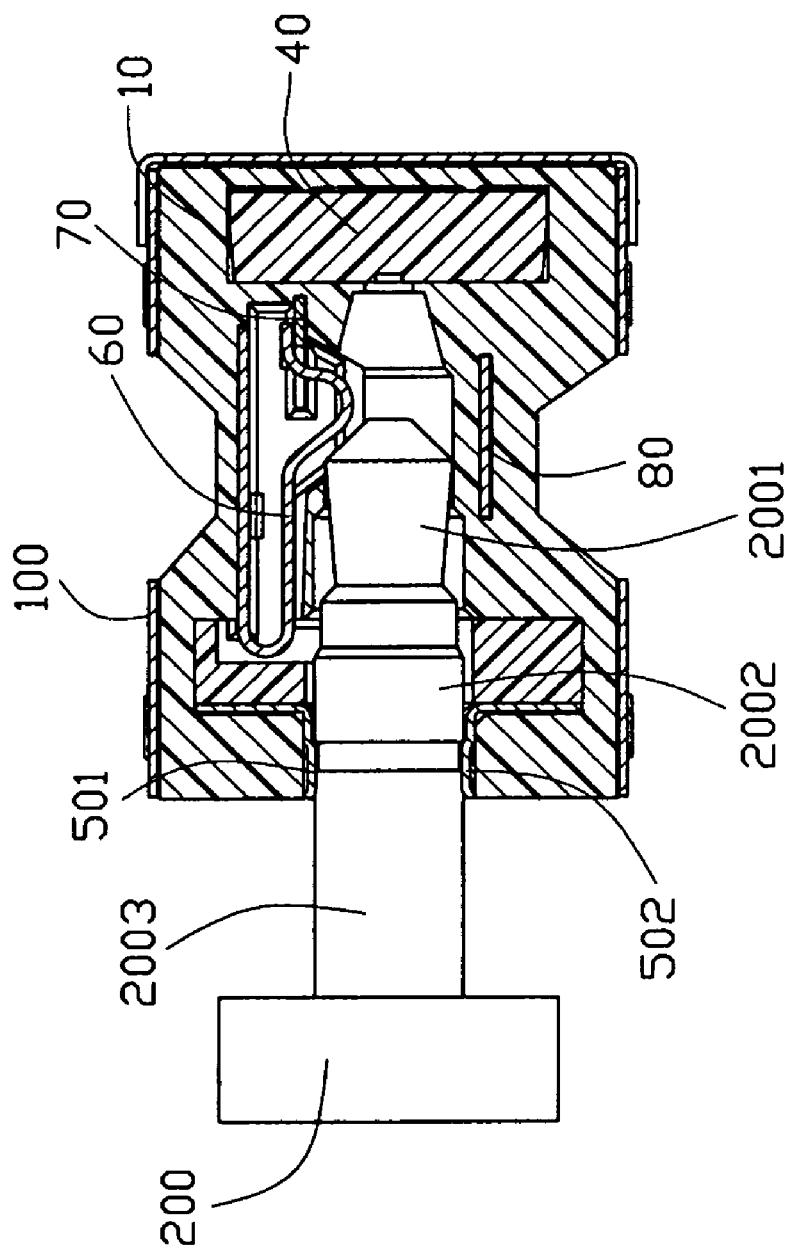
Figure 7:
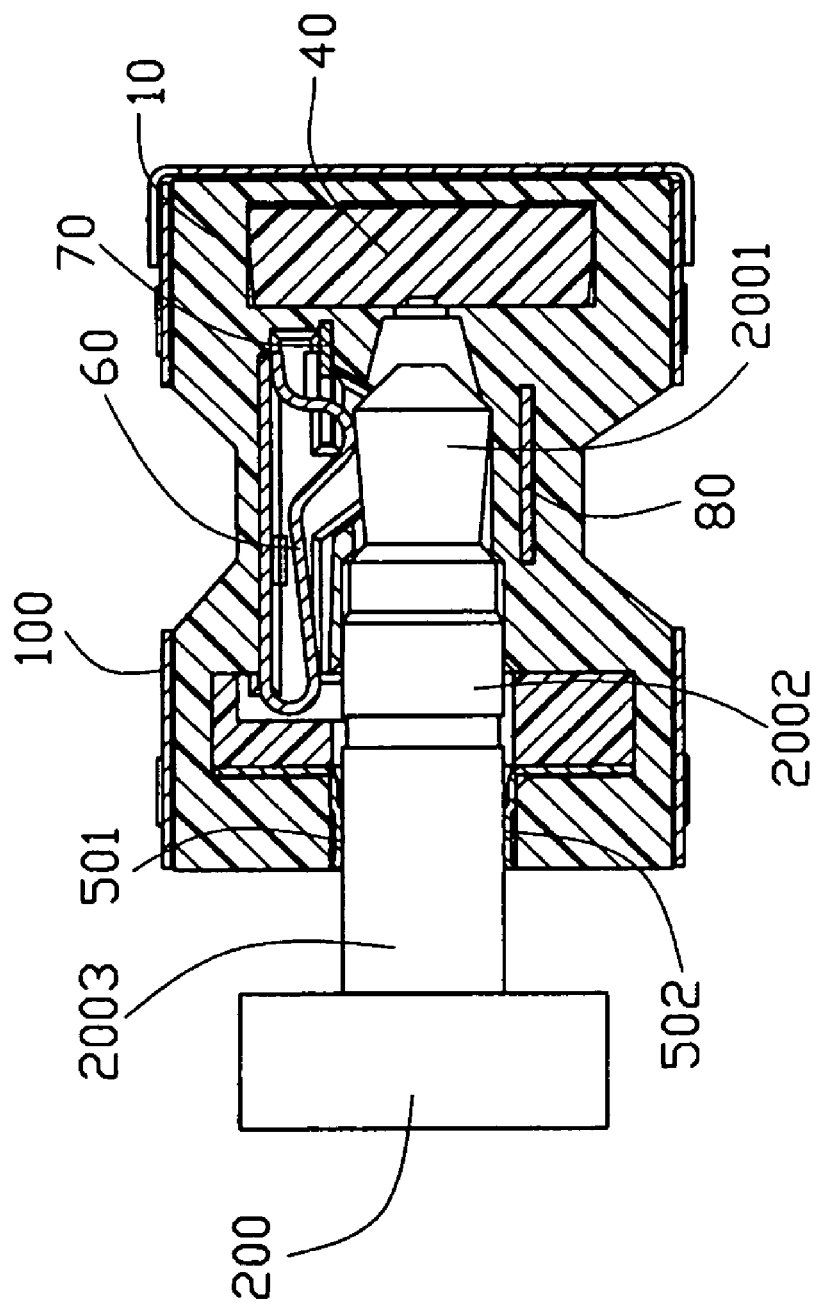

Refer to FIGS. 5-7, the connector 100 is engaged with an audio plug 200, the plug 200 comprises a first contacting portion 2001, a second contacting portion 2002 and a grounding portion 2003. When the plug 200 is plugged on the connector 100, the grounding terminal 501 is assembled in a proper position to contact with the grounding portion 2003 before the contacting portions 2001, 2002 contacting with the signal terminals 60, 70 and 80 in the connector 100. It prevents the connector from producing a noise when the plug plugged therein. Further more the connector 100 has a detecting terminal 502 to detect whether an audio plug or an optical plug is plugged therein.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An optical-electric connector for connecting with an audio plug or an optical plug selectively, comprising:
    an insulating housing defining a mating face having a mating hole thereon, a receiving room communicating with the mating hole and a plurality of terminal slots;
    at least a signal terminal and a grounding terminal received in the terminal slots of the insulating housing;
    an optical element assembled in the insulating housing;
    a shielding shell substantially enclosing the insulating housing;.
    wherein the grounding terminal is assembled in a proper position for contacting with a grounding portion of the corresponding audio plug or optical plug before the signal terminal contacts with a contacting portion of the audio plug or optical plug formed in front of the grounding portion.

2. The optical-electric connector as described in claim 1, wherein the grounding terminal has a C-shaped contacting portion mounted in an inner mating face of the mating hole for contacting with the audio plug or optical plug.

3. The optical-electric connector as described in claim 1, further a comprising a detecting terminal having a contacting portion mounted in an inner mating face of the mating hole for detecting whether the audio plug or the optical plug is plugged in.

4. The optical-electric connector as described in claim 3, wherein the grounding terminal and the detecting terminal each have a C-shaped contacting portion formed symmetrically and mounted in two sides of an inner mating face of the mating hole respectively.

5. The optical-electric connector as described in claim 1, wherein the shielding shell has a resilient plate extending rearwardly and upwardly, and the resilient plate comprises a contacting portion at a distal end thereof.

6. The optical-electric connector as described in claim 1, wherein the insulating housing comprises a pair of depressed portions at opposite lateral sides thereof, and the shielding shell defines a pair of depressions corresponding to the depressed portions of the insulating housing.

7. The optical-electric connector as described in claim 1, further comprising a retainer assembled at a bottom of the insulating housing, the retainer comprising a plurality of passageways corresponding to the terminals slots and a receiving portion for receiving the optical element.

8. The optical-electric connector as described in claim 7, wherein the insulating housing his a front wall comprising a slot, and wherein the retainer comprises a block received in the slot.

9. The optical-electric connector as described in claim 7, wherein the lateral wall of the insulating housing comprises a cutout, and the retainer defines a protrusion received in the cutout and extending beyond the insulating housing.

10. The optical-electric connector as described in claim 9, wherein the shielding shell comprises a flat portion and a pair of lateral plates extending from the flat portion, and each lateral plate comprises a retaining hole engaging with the protrusion of the retainer.

11. The optical-electric connector as disclosed in claim 1, wherein the optical element comprises a receiving portion, and the receiving portion comprises a plugging hole for the audio plug or optical plug to extend therethrough.

12. The optical-electric connector as described in claim 1, wherein the insulating housing comprises a separating portion dividing the receiving room into a front receiving room and a rear receiving room, and the terminals are received in the front receiving room and the optical element is received in the rear receiving room.

13. An optical-electric connector for connecting with an audio plug or an optical plug selectively, comprising:

an insulating housing defining a mating face having a mating hole thereon, a receiving room communicating with the mating hole and a plurality of terminal slots;

terminals received in the insulating housing;

an optical element assembled in the insulating housing;

a shielding shell substantially enclosing the insulating housing;

wherein the terminals comprise a grounding terminal and a detecting terminal mounted near to the mating face and each having a C-shaped contacting portion mounted symmetrically in an inner mating face of the mating hole.

14. An connector for connecting with a corresponding plug, comprising:

an insulating housing defining a mating face having a mating hole thereon, a receiving room communicating with the mating hole;

a plurality of terminals received in the insulating housing;

wherein two terminals are mounted near to the mating hole and each of the two terminals has a C-shaped contacting portion formed almost symmetrically and mounted in an inner mating face of the mating hole and a vertical plate directly connected to the C-shaped contacting portion and perpendicular to an axial direction of said mating hole.

15. The connector as described in claim 14, wherein the terminal near to the mating hole comprises a grounding terminal.

16. The connector as described in claim 14, further comprises an optical element assembled in the insulating housing and the terminal near to the mating hole comprises a detecting terminal.

17. The connector as described in claim 14, wherein said vertical plate is essentially sandwiched between the insulating housing and a retainer in said axial direction.

* * * * *